United States Patent
Yokoi et al.

(10) Patent No.: US 9,229,357 B2
(45) Date of Patent: Jan. 5, 2016

(54) DEVELOPING DEVICE, BLADE ASSEMBLY, AND DEVELOPING DEVICE MANUFACTURING METHOD

(71) Applicant: Brother Kogyo Kabushiki Kaisha, Nagoya-shi, Aichi-ken (JP)

(72) Inventors: Junichi Yokoi, Nagoya (JP); Hikaru Yoshizumi, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/230,502

(22) Filed: Mar. 31, 2014

(65) Prior Publication Data

US 2015/0093155 A1 Apr. 2, 2015

(30) Foreign Application Priority Data

Sep. 30, 2013 (JP) ................................ 2013-205678

(51) Int. Cl.
  *G03G 15/08* (2006.01)
  *B23K 26/06* (2014.01)
  *B23K 26/08* (2014.01)
  *B23K 26/24* (2014.01)
  *B23K 26/32* (2014.01)

(52) U.S. Cl.
  CPC .......... *G03G 15/0812* (2013.01); *B23K 26/063* (2013.01); *B23K 26/083* (2013.01); *B23K 26/0869* (2013.01); *B23K 26/246* (2013.01); *B23K 26/3206* (2013.01); *B23K 26/3233* (2013.01); *B23K 2201/18* (2013.01)

(58) Field of Classification Search
  CPC .......... G03G 15/0812; G03G 15/0817; G03G 2215/0177; B23K 2201/18; B23K 26/063; B23K 26/083; B23K 26/0869; B23K 26/246; B23K 26/3206; B23K 26/3233
  USPC .................................................. 399/284, 350
  See application file for complete search history.

(56) References Cited

U.S. PATENT DOCUMENTS

| 6,175,708 B1 | 1/2001 | Ohashi et al. |
| 2001/0031158 A1* | 10/2001 | Yokomori .......... G03G 15/0812 399/284 |

(Continued)

FOREIGN PATENT DOCUMENTS

| EP | 1394629 A1 | 3/2004 |
| GB | 2342881 A | 4/2000 |

(Continued)

OTHER PUBLICATIONS

Feb. 23, 2015—(US) Non-Final Office Action—U.S. Appl. No. 14/230,755.

(Continued)

*Primary Examiner* — Francis Gray
(74) *Attorney, Agent, or Firm* — Banner & Witcoff, Ltd.

(57) ABSTRACT

A developing blade apparatus may include a supporting a protrusion and a developing blade connected to the supporting member and including an opening. The protrusion of the supporting member may be disposed within the opening. The developing blade may include a plurality of weld marks that includes a first weld mark and a second weld mark. The protrusion and the opening are disposed between the first weld mark and the second weld mark on an imaginary straight line connecting the first weld mark and the second weld mark.

13 Claims, 9 Drawing Sheets

(56) References Cited

U.S. PATENT DOCUMENTS

| | | | |
|---|---|---|---|
| 2004/0120734 A1* | 6/2004 | Okamoto | G03G 15/0812 399/284 |
| 2006/0024085 A1* | 2/2006 | Sato | G03G 15/0812 399/103 |
| 2008/0118280 A1 | 5/2008 | Han et al. | |
| 2009/0188897 A1 | 7/2009 | Margairaz et al. | |
| 2012/0272611 A1 | 11/2012 | Tsukimoto et al. | |
| 2013/0170876 A1 | 7/2013 | Brown et al. | |
| 2013/0232749 A1 | 9/2013 | Bruck et al. | |

FOREIGN PATENT DOCUMENTS

| | | | |
|---|---|---|---|
| JP | 57-78574 A | | 5/1982 |
| JP | 2001-356592 A | | 12/2001 |
| JP | 2003145932 A | * | 11/2004 |
| JP | 2006145932 A | * | 6/2006 |
| JP | 2008290083 A | | 12/2008 |

OTHER PUBLICATIONS

European Search Report issued Feb. 18, 2015 for European Application No. 14186531.1.

Feb. 10, 2015—(US) Non-Final Office Action—U.S. Appl. No. 14/230,916.

European Search Report issued Mar. 20, 2015 in European Application No. 14186524.6.

Tritium: "Solar Panel Tig welding" Retrieved from the Internet: URL: http://weldingweb.com/showthread.php?57437?Solar?Panel?Tig?welding&p=523926#post523926 last visited on May 21, 2015.

Nov. 13, 2015—(US) Non-Final Office Action—U.S. Appl. No. 14/230,755.

\* cited by examiner

DEVELOPING DEVICE, BLADE ASSEMBLY, AND DEVELOPING DEVICE MANUFACTURING METHOD

CROSS-REFERENCE TO RELATED APPLICATION

This application claims priority from Japanese Patent Application No. 2013-205678, filed on Sep. 30, 2013, which is incorporated herein by reference in its entirety.

TECHNICAL FIELD

Aspects disclosed herein relate to a blade assembly in which a blade is joined to a supporting member by welding, a developing device using the blade assembly, and a manufacturing method of the developing device.

BACKGROUND

Conventionally, there has been an electrophotographic image forming apparatus that includes a developing device including a developing roller and a blade assembly for regulating a thickness of a developer layer held on the developing roller. Further, there has been known a blade assembly that includes a blade that contacts the developing roller and a supporting member that holds the blade in an overlapping manner.

The blade has a pair of openings and the supporting member includes a pair of positioning protrusions. The openings are engaged with the positioning protrusions, respectively, thereby determining a position of the blade with respect to the supporting member in the blade assembly. The blade is welded to the supporting member at a portion of the blade between the positioning protrusions along the blade in an extended dimension of the blade.

SUMMARY

In the known blade assembly, as described above, the blade may be welded to the supporting member at the portion of the blade between the positioning protrusions only. In some cases, therefore, one or more portions of the blade around one or both of the openings may come off from the supporting member. When such a case happens, a contact pressure between the blade and the developing roller may vary greatly, thereby causing degradation in print quality.

Accordingly, for example, aspects of the disclosure provide for a developing device, a blade assembly, and a developing device manufacturing method in which a blade may be securely fixed to a supporting member to improve print quality.

According to the aspects of the disclosure, a developing blade apparatus may include a supporting a protrusion and a developing blade connected to the supporting member and including an opening. The protrusion of the supporting member may be disposed within the opening. The developing blade may include a plurality of weld marks that includes a first weld mark and a second weld mark. The protrusion and the opening are disposed between the first weld mark and the second weld mark on an imaginary straight line connecting the first weld mark and the second weld mark.

According to the aspects of the disclosure, the blade may be welded to the supporting member at the plurality of locations in the vicinity of the positioning protrusion, thereby preventing or reducing coming off of the blade from the supporting member in the vicinity of the positioning protrusion. This configuration may therefore prevent or reduce an occurrence of variations in contact pressure between the blade and the developing roller, thereby improving print quality.

This summary is not intended to identify critical or essential features of the disclosure, but instead merely summarizes certain features and variations thereof. Other objects, features, and advantages will be apparent to persons of ordinary skill in the art from the following detailed description of the disclosure and the accompanying drawings.

DESCRIPTION OF THE DRAWINGS

Aspects of the disclosure are illustrated by way of example and not by limitation in the accompanying figures in which like reference characters indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments of the disclosure will be described in detail with reference to the accompanying drawings.

Figure 1:
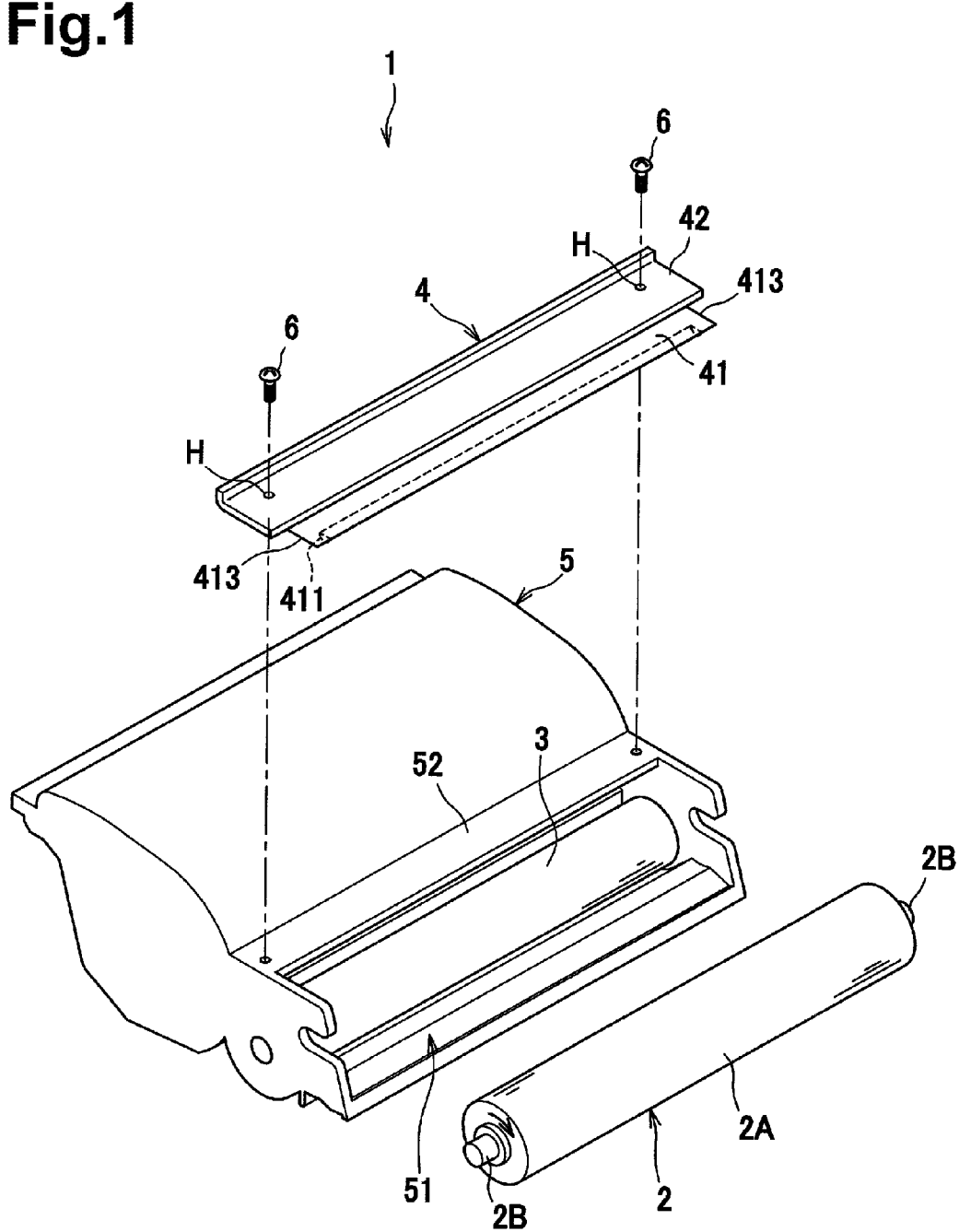
FIG. 1 is a disassembled perspective view depicting a developing device in an illustrative embodiment according to one or more aspects of the disclosure.

As depicted in FIG. 1, a developing device 1 may comprise a developing roller 2 (an example of a developer carrier), a supply roller 3, a blade unit (or blade assembly) 4, and a developing case 5 that may hold these components.

The developing case 5 may be a container having therein a toner storage chamber 53 capable of storing toner therein. The developing case 5 may also be formed to define an opening 51 in one of its surfaces. The developing case 5 may define an edge of the opening 51 and comprise a blade support surface 52 to which the blade unit 4 may be fixed.

Figure 2:
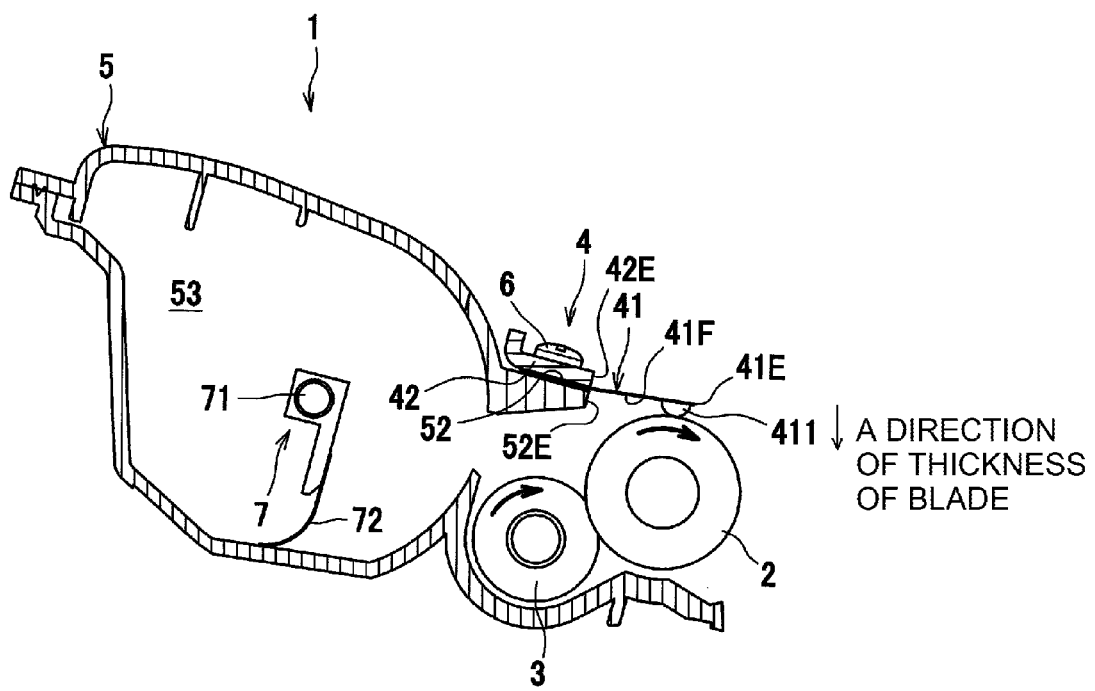
FIG. 2 is a sectional view depicting the developing device in the illustrative embodiment according to one or more aspects of the disclosure.

As depicted in FIG. 2, a conveyor member 7 for conveying toner toward the supply roller 3 may be disposed in the toner storage chamber 53. The conveyor member 7 may comprise a shaft portion 71 that may be rotatably supported by the developing case 5, and a film 72 (or other agitator) that may rotate along with rotation of the shaft portion 71.

As depicted in FIG. 1, the developing roller 2 may comprise a cylindrical roller body 2A and a shaft 2B that may be inserted into the roller body 2A and may rotatably interface with the roller body 2A. The roller body 2A may have elasticity and may be capable of holding toner on its cylindrical surface. The developing roller 2 may be disposed to close or partially close the opening 51 of the developing case 5. The shaft 2B may protrude from the roller body 2A in an axial direction of the developing roller 2 and may be rotatably supported by the developing case 5.

The supply roller 3 may be disposed inside the developing case 5 in contact with the developing roller 2, and may be rotatably supported by the developing case 5. The supply roller 3 may be configured to supply toner stored in the developing case 5 to the developing roller 2 as the developing roller 2 rotates.

The blade unit 4 may comprise a blade 41 and a supporting member 42. The blade 41 may be disposed near the developing roller 2 such that a tip of the blade 41 may be placed on the developing roller 2. The supporting member 42 may hold the blade 41.

The blade 41 may comprise sheet metal having an approximately rectangular shape (e.g., sheet metal having two longer sides and two shorter sides). The blade 41 may be positioned so that a longer side of the blade extends in a direction that an axis of the developing roller 2 may extend (hereinafter, this direction may be referred to as the longer direction LD (see FIG. 3A)). That is, a longer side of the blade 41 may be approximately parallel to the axial direction of the developing roller 2, and a shorter side of the blade 41 may be approximately perpendicular to the axial direction of the developing roller 2 (hereinafter, this approximately perpendicular direction may be referred to as the shorter direction SD (see FIG. 3A)). The blade 41 may be made of metallic material, for example, stainless steel. In other embodiments, for example, the blade 41 may comprise a sheet metal whose surface may have a coating including press oil.

For example, the blade 41 may have a thickness of 0.05 to 2.5 mm, a thickness of 0.05 to 0.12 mm, a thickness of 0.05 to 1.00 mm, a thickness of 0.07 to 0.15 mm, or a thickness of 0.08 to 0.12 mm. A longer dimension (e.g., a length) of the blade 41 (extending in the longer direction) may be greater than a dimension of the roller body 2A of the developing roller 2 in the axial direction. For example, the blade 41 may have a length of 218 to 270 mm, a length of 220 to 260 mm, or a length of 222 to 250 mm.

The blade 41 may comprise a contact portion 411, which may protrude toward the developing roller 2 and directly contact the roller body 2A of the developing roller 2. The contact portion 411 may protrude from a distal end 41E of a lower surface 41F (e.g., a surface facing the developing roller 2) of the blade 41 (see FIG. 2). The contact portion 411 may be made of, for example, rubber and may extend in the longer direction of the blade 41.

The supporting member 42 may be a member for fixing or otherwise holding a fixed end of the blade 41 to the developing case 5.

The supporting member 42 may be made of metallic material, for example, electrolytic zinc-coated carbon steel sheet. The supporting member 42 may have a thickness greater than the blade 41 and an approximately or substantially rectangular shape. A longer side of the supporting member 42 may be positioned so that it extends in a direction that is approximately parallel to the longer side of the blade 41. The supporting member 42 may extend so as to exceed both ends 413 of the blade 41. That is, the longer side of the supporting member 42 may be longer than the longer side of the blade 41.

The ends of the supporting member 42 may extend past the ends 413 of the blade 41. The supporting member 42 may extend over the blade 41 on a side opposite to the blade support surface 52 so that the supporting member 42 may pinch the blade 41 in conjunction with the blade support surface 52 of the developing case 5. In other words, the supporting member 42 and blade support surface 52 may be positioned such that the blade 41 is interposed therebetween. The blade 41 may be pinched between an edge 42E of the supporting member 42 and an edge 52E of the support surface 52. A portion, which may contact the edge 42E of the supporting member 42 and the edge 52E of the blade support surface 52, of the blade 41 may function as a fulcrum when the blade 41 bends.

The blade unit 4 configured as described above may be fixed to the developing case 5 using screws 6 through holes H in the blade 41 and the supporting member 42. In this state, the blade unit 4 may be configured to regulate a thickness of a toner layer attaching to the developing roller 2. In particular, the contact portion 411 of the blade 41, which may contact the rotating developing roller 2, may regulate a thickness of the toner layer by blocking excess toner from passing as the developing roller 2 rotates.

Figure 3A:
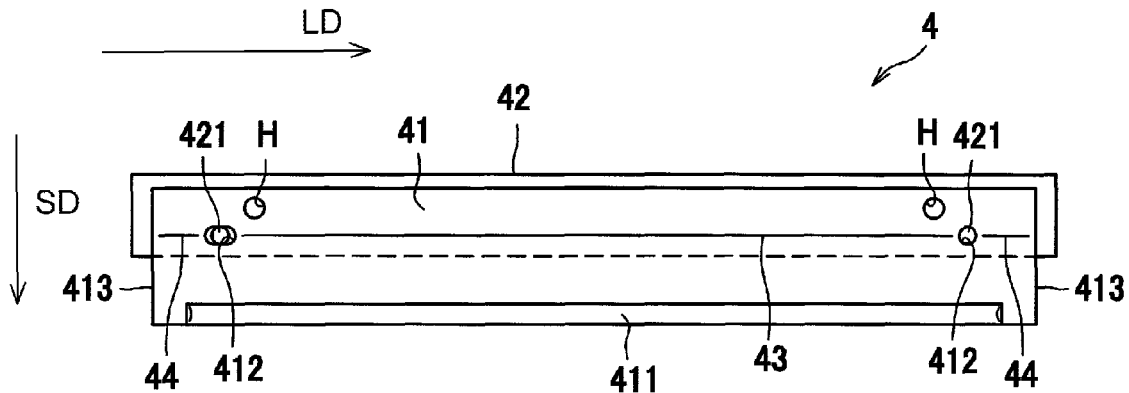
FIG. 3A illustrates a blade unit according to one or more aspects of the disclosure.

As depicted in FIG. 3A, the supporting member 42 may comprise a positioning protrusion 421, which may be engaged with the blade 41, e.g., at opposite end portions of the longer side of the blade 41. The positioning protrusion 421 may protrude from a surface of the supporting member 42 that faces the blade 41. As shown in the example embodiment of FIG. 3A, the blade 41 may have a pair of openings 412 that may be engaged with a pair of positioning protrusions 421. One of the pair of openings 412 may be a circular opening 412R and the other of the pair of openings 412 may be an elongated opening 412L. The elongated opening 412L of the pair of openings 412 may absorb a dimensional deviation between the two openings 412 and linear expansion of the blade 41 and/or the supporting member 42 in the longer direction that may occur during welding. In other words, for example, the elongated opening 412L may be elongated in order for the blade 41 to stay engaged with one of the positioning protrusions 421 if the blade 41 expands as a result of welding.

Figure 3B:
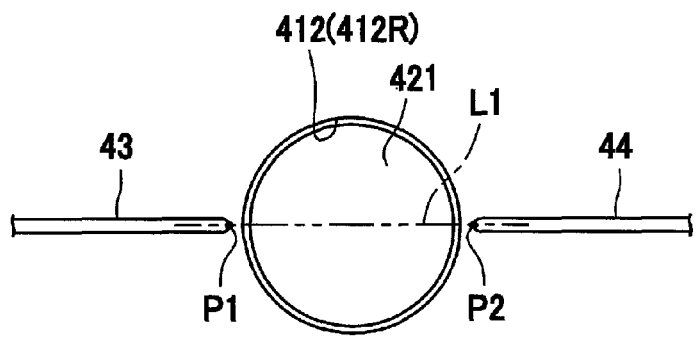
FIG. 3B is an enlarged view of a first weld mark and a second weld mark formed in the vicinity of a circular opening according to one or more aspects of the disclosure.
Figure 3C:
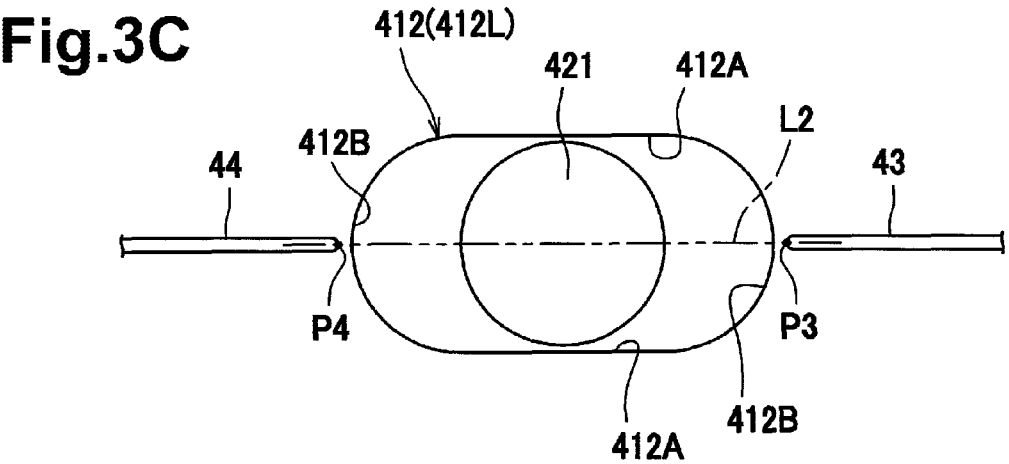
FIG. 3C is an enlarged view of a first weld mark and a second weld mark formed in the vicinity of an elongated opening according to one or more aspects of the disclosure.

As depicted in FIG. 3B, the circular opening 412R may have substantially the same size as the corresponding positioning protrusion 421. As depicted in FIG. 3C, the elongated opening 412L may comprise a pair of first edges 412A and a pair of second edges 412B. The first edges 412A may be spaced apart from each other at an interval that may be substantially equal to the diameter of the corresponding positioning protrusion 421 and may be positioned on opposite sides of the corresponding positioning protrusion 421 in the shorter direction of the blade 41. The second edges 412B may be spaced apart from each other at an interval that may be greater than the diameter of the corresponding positioning protrusion 421 and may be positioned on opposite sides of the corresponding positioning protrusion 421 in the longer direction of the blade 41.

As depicted in FIG. 3A, the blade 41 may be positioned with respect to the supporting member 42 by the engagement of the openings 412 and the corresponding positioning protrusions 421, respectively.

The blade 41 may be welded to the supporting member 42 at a plurality of locations along the blade 41 in the longer direction. More specifically, the blade 41 may be joined to the supporting member 42 by laser welding at multiple portions of the blade 41, including portions of the blade 41 between the positioning protrusions 421 and the ends 413 of the blade 41 and portions of the blade 41 between the positioning protrusions 421 themselves.

The blade 41 may have a first weld mark 43, which may join the blade 41 and the supporting member 42 at a position between the positioning protrusions 421, and second weld marks 44, which may join the blade 41 and the supporting member 42 at respective positions located towards an outer edge of the supporting member 42 from the respective positioning protrusions 421 in the longer direction.

The first weld mark 43 may extend from a vicinity of one of the openings 412 to a vicinity of the other of the openings 412 along the longer dimension of the blade 41. Edges of the first weld mark 43 may be, for example, 0.1 to 5.0 mm apart from the edge of the circular opening 412R and the edge of the elongated opening 412L, respectively. In other embodiments, for example, the edges of the first weld mark 43 may be 0.1 to 4.0 mm, 0.5 to 3.0 mm, or 0.7 to 2.0 mm apart from the edge of the circular opening 412R and the edge of the elongated opening 412L, respectively.

As depicted in FIG. 3A, the second weld marks 44 may extend from respective vicinities of the openings 412 to respective vicinities of the ends 413 of the blade 41 along the longer direction of the blade 41. Edges of each second weld mark 44 may be, for example, 0.1 to 5.0 mm apart from the edge of the circular opening 412R and the edge of the elongated opening 412L, respectively. In other embodiments, for example, the edges of each second weld mark 44 may be 0.1 to 4.0 mm, 0.5 to 3.0 mm, or 0.7 to 2.0 mm apart from the edge of the circular opening 412R and the edge of the elongated opening 412L, respectively.

As depicted in FIG. 3B, an edge, which may be located close to the circular opening 412R, of the first weld mark 43 and an edge, which may be located close to the circular opening 412R, of the second weld mark 44 may be located on opposite sides of the positioning protrusion 421, which may be engaged with the circular opening 412R, in the direction that the contact portion 111 may extend, that is, in the longer direction of the blade 41.

The first weld mark 43 may comprise a proximity point P1 that may be closest to the positioning protrusion 421, with which the circular opening 412R may be engaged, in the vicinity of the positioning protrusion 421. The second weld mark 44 may comprise a proximity point P2 that may be closest to the positioning protrusion 421, with which the circular opening 412R may be engaged, in the vicinity of the positioning protrusion 421. A line segment L1 intersecting the proximity point P1 and the proximity point P2 may pass the positioning protrusion 421.

As depicted in FIG. 3C, an edge, which may be located close to the elongated opening 412L, of the first weld mark 43 and an edge, which may be located close to the elongated opening 412L, of the second weld mark 44 may be located on opposite sides of the positioning protrusion 421, which may be engaged with the elongated opening 412L, in the longer direction of the blade 41.

The first weld mark 4 may comprise a proximity point P3 that may be closest to the positioning protrusion 421, with which the elongated opening 412L may be engaged, in the vicinity of the positioning protrusion 421. The second weld mark 44 may comprise a proximity point P4 that may be closest to the positioning protrusion 421, with which the elongated opening 412L may be engaged, in the vicinity of the positioning protrusion 421. A line segment L2 intersecting the proximity point P3 and the proximity point P4 may pass the positioning protrusion 421.

Hereinafter, advantages of the blade unit 4, configured in accordance with this disclosure, are described.

The blade 41 may be welded to the supporting member 42 at a plurality of, for example, two, locations on opposite sides of each positioning protrusion 421 in the vicinity of each positioning protrusion 421, thereby preventing or reducing coming off of the blade 41 from the supporting member 42. Therefore, variations in contact pressure between the blade 41 and the developing roller 2 may be reduced, thereby improving print quality.

Next, a manufacturing method of the developing device 1 is described.

Figure 4A:
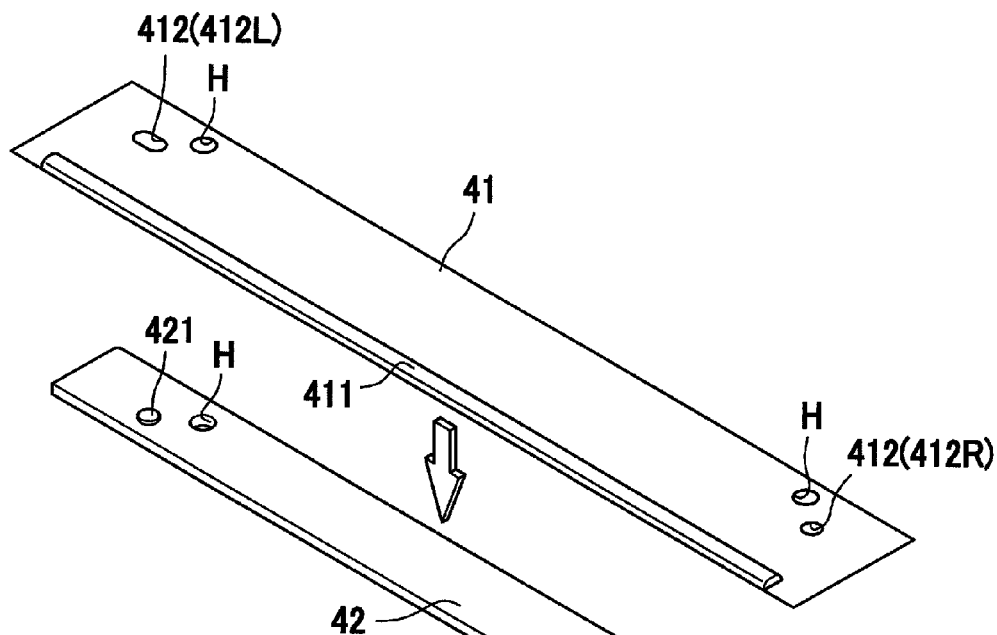
FIG. 4A is a diagram for explaining a positioning process in a developing device manufacturing method according to one or more aspects of the disclosure.

When the blade unit 4 is assembled, as depicted in FIG. 4A, the blade 41 may first be placed on the supporting member 42. At that time, the openings 412 in the blade 41 may be engaged with the corresponding positioning protrusions 421 of the supporting member 42 (e.g., a positioning process).

Figure 4B:
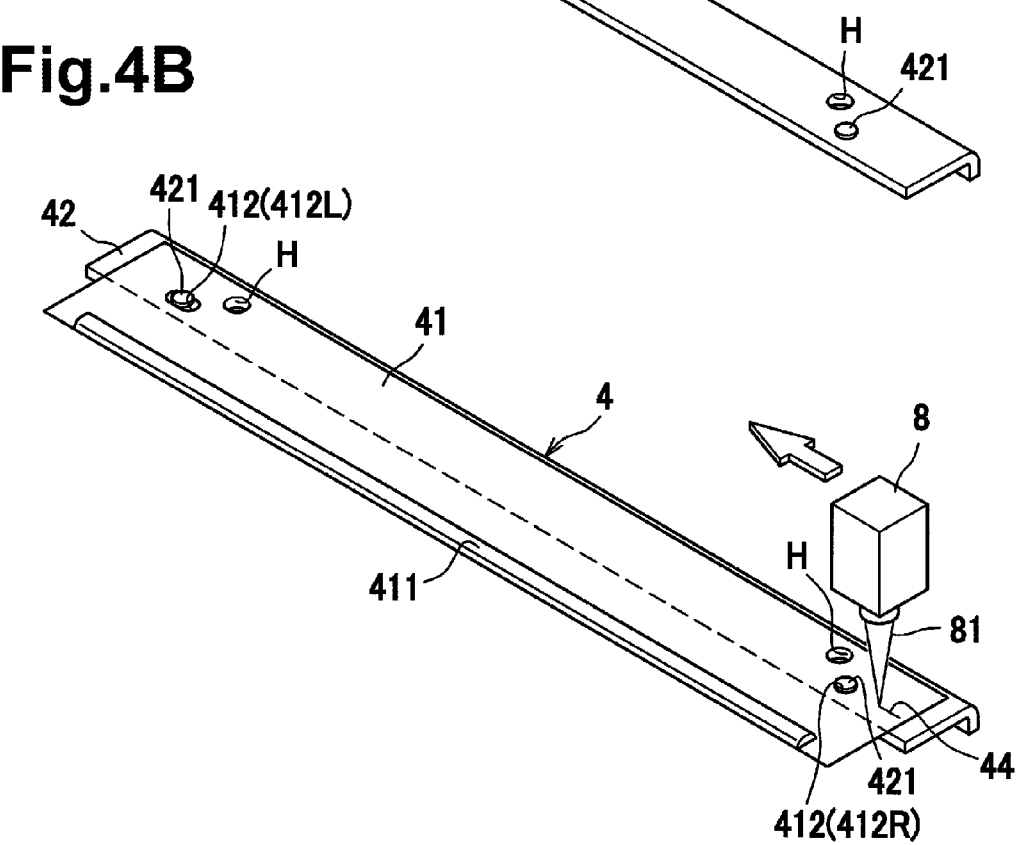
FIG. 4B is a diagram for explaining a welding process in the developing device manufacturing method according to one or more aspects of the disclosure.

Then, the blade 41 and the supporting member 42 may be fastened on a worktable. Thereafter, as depicted in FIG. 4B, while a laser beam 81 irradiated from the welding machine 8 is moved with respect to the blade 41, the laser beam 81 may be irradiated onto the blade 41 to weld the blade 41 and the supporting member 42 to each other (e.g., a welding process).

In some embodiments, the welding machine 8 may be configured to irradiate a portion, which may face the welding machine 8, of an object with a continuous wave laser or a pulsed laser. That is, the laser beam 81 may be a continuous wave laser or a pulsed laser. In other embodiments, for example, another welding machine that may be configured to irradiate the blade 41 with a laser beam by moving a reflector provided inside the welding machine, without moving the welding machine itself, may be used. For example, a fiber laser may be used as the continuous wave laser, and an yttrium aluminum garnet ("YAG") laser or a fiber laser may be used as the pulsed laser. In particular, a fiber laser (which emits a laser beam with a relatively small diameter) may be used so that the welding process for creating overlapping weld marks does not cause overheating and/or deformation of the blade 41 and/or the supporting member 42.

In the welding process, the laser beam 81 may be moved with respect to the blade 41 along the longer direction of the blade 41 from one end portion, in which the circular opening 412R may be defined, to the other end portion, in which the elongated opening 412L may be defined. In particular, the laser beam 81 may be moved on a straight line passing through the positioning protrusions 42 along the longer direction of the blade 41. That is, a portion of the blade 41 between the end portion, which may be located closer to the circular opening 412R, of the blade 41 and the vicinity of the circular opening 412R may be welded first to form a second weld mark 44. Then, a portion of the blade 41 between the circular opening 412R and the elongated opening 412L may be welded to form a first weld mark 43. Thereafter, a portion of the blade 41 between the vicinity of the elongated opening 412L and the end portion, which may be located closer to the elongated opening 412L, of the blade 41 may be welded to form another second weld mark 44.

Then, the laser beam 81 may be irradiated onto portions between the ends 413 of the blade 41 and the edges of the openings 412, without contacting the ends 413 of the blade 41 and the edges of the openings 412.

Using the manufacturing method according to the disclosure, the blade 41 may be welded to the supporting member 42 at the plurality of, for example, two, locations on opposite sides of each positioning protrusion 421 in the vicinity of each positioning protrusion 421.

Starting the welding from the vicinity of the circular opening 412R and ending at the vicinity of the elongated opening 412L as described above may allow the elongated opening 412 to absorb a thermal expansion of the blade 41 that may occur during welding.

While the disclosure has been described in detail with reference to example embodiments thereof, it is not limited to such examples. Various changes, arrangements and modifications may be applied to the detailed configuration without departing from the spirit and scope of the disclosure. In the description below, common parts have the same reference numerals as those of the above-described embodiments, and the detailed description of the common parts is omitted.

Figure 5A:
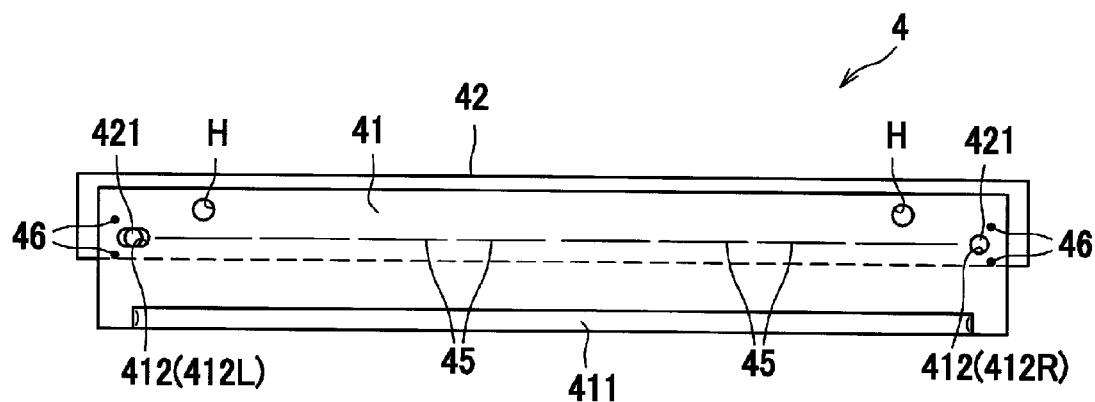
FIG. 5A illustrates a blade unit in a first variation according to one or more aspects of the disclosure.

As described above, the blade 41 may be welded to the supporting member 42 at the plurality of, for example, two, locations on opposite sides of each positioning protrusion 421 in the vicinity of each positioning protrusion 421. However, the number of locations where the blade 41 and the supporting member 42 may be welded to each other might not be limited to that example. In other embodiments, for example, as depicted in FIG. 5A, the blade 41 and the supporting member 42 may be welded to each other at, for example, three locations in the vicinity of each positioning protrusion 421.

More specifically, a third weld mark 45 and two fourth weld marks 46 may be formed in the vicinity of each positioning protrusion 421 on the blade 41.

Third weld marks 45 may be formed at a plurality of locations between the positioning protrusions 421 in the longer direction of the blade 41. Of the third weld marks 45, third weld marks 45 that may be formed at respective positions closest to the positioning protrusions 421, respectively, may be positioned such that their edges, which may be located close to the respective positioning protrusions 421, are located near the respective edges of the openings 412.

The fourth weld marks 46 may have a circular shape. The fourth weld marks 46 may be formed at two respective locations located towards the outer edges of the blade 41 from the respective positioning protrusions 421 in the longer direction of the blade 41. The fourth weld marks 46 may be spaced apart from each other in the shorter direction of the blade 41 while the fourth weld marks 46 are located on opposite sides of each positioning protrusion 421.

Figure 5B:
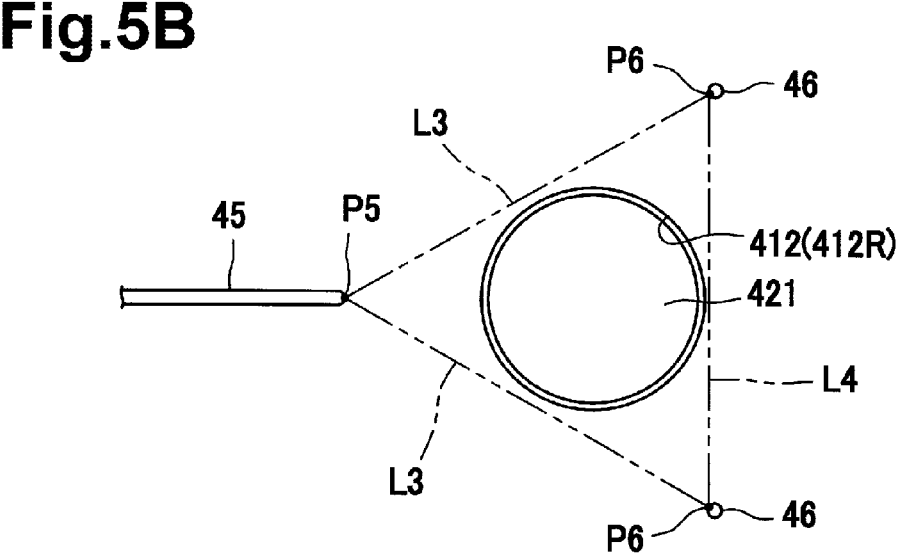
FIG. 5B is an enlarged view of a third weld mark and fourth weld marks formed in the vicinity of the circular opening in the first variation according to one or more aspects of the disclosure.

As depicted in FIG. 5B, the third weld mark 45 may comprise a proximity point P5 that may be closest to the positioning protrusion 421 with which the circular opening 412R may be engaged. Each fourth weld mark 46 may comprise a proximity point P6 that may be closest to the positioning protrusion 421 with which the circular opening 412R may be engaged. A line segment L3 extending between the proximity point P5 and one of the proximity points P6, another line segment L3 extending between the proximity point P5 and the other of the proximity points P6, and a line segment L4 extending between the proximity points P6 may enclose the positioning protrusion 421.

Figure 6:
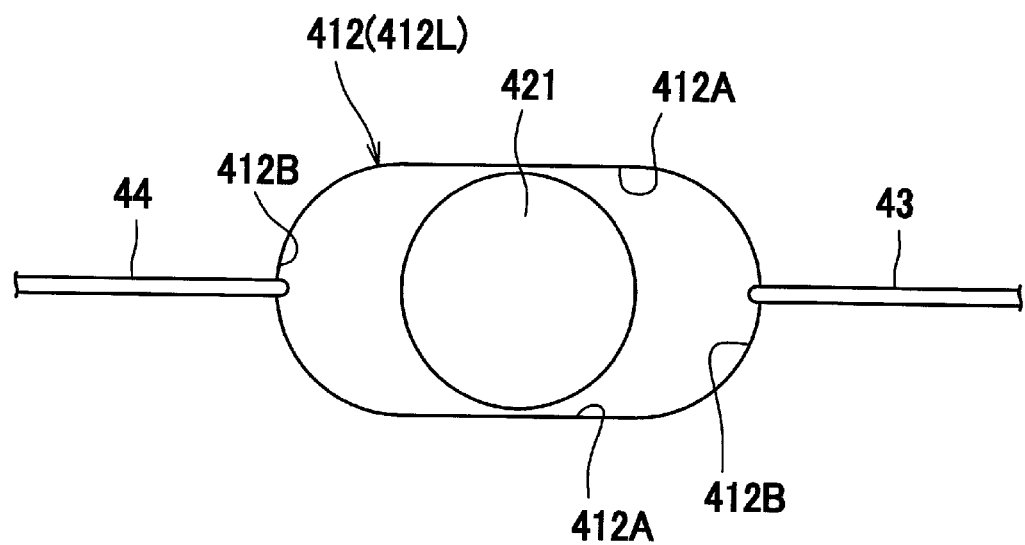
FIG. 6 is an enlarged view of a first weld mark and a second weld mark formed in the vicinity of the elongated opening in a second variation according to one or more aspects of the disclosure.

As described above, the first weld mark 43 and the second weld mark 44 may be formed without contacting the edges of the openings 412. However, the locations where the weld marks may be formed might not be limited to that example. In other embodiments, for example, as depicted in FIG. 6, the first weld mark 43 and the second weld mark 44 formed around the elongated opening 412L may contact the edges (e.g., the second edges 412B) of the elongated opening 412L or extend to the elongated opening 412L beyond the edges (e.g., the second edges 412B) of the elongated opening 412L.

Figure 7:
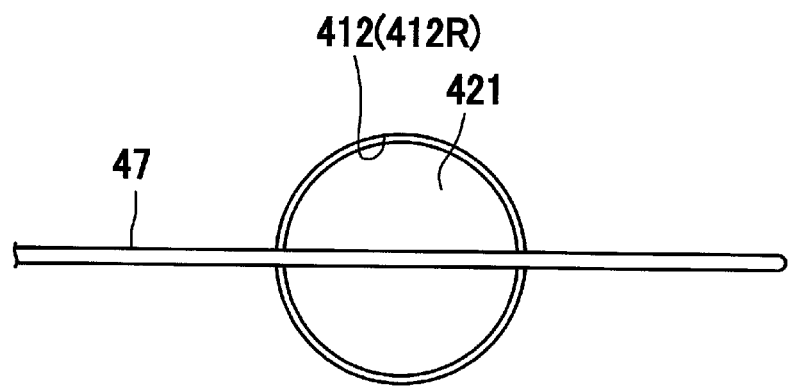
FIG. 7 is an enlarged view of a fifth weld mark formed at and in the vicinity of the circular opening according to one or more aspects of the disclosure.

In other embodiments, for example, as depicted in FIG. 7, one or more portions of the edge of the circular opening 412R and the corresponding positioning protrusion 421 may be welded to each other. The blade 41 may thus have a weld mark 47 that may join the positioning protrusion 421 and the one or more portions of the edge of the circular opening 412R in the blade 41 to each other.

Figure 8:
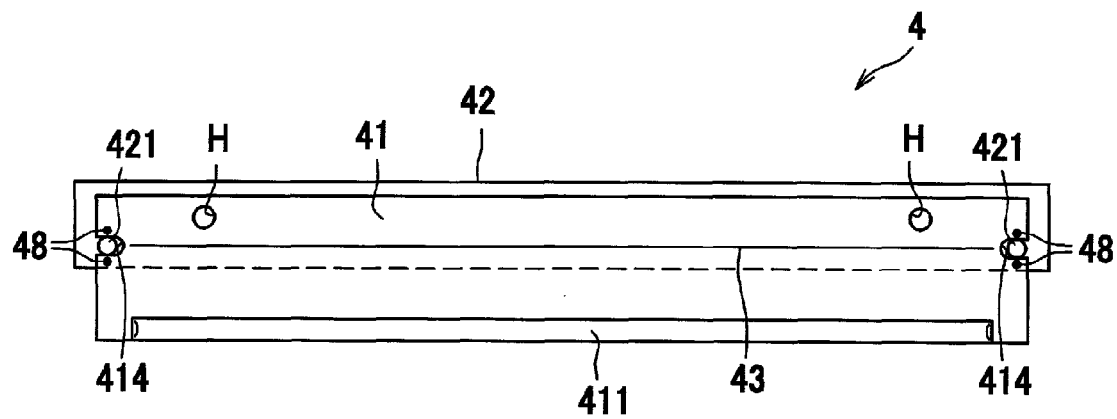
FIG. 8 illustrates a blade unit in a fourth variation according to one or more aspects of the disclosure.

As described above, the openings 412 may comprise the circular opening 412R and the elongated opening 412L. However, the shapes of the pair of openings might not be limited to that example. In other embodiments, for example, as depicted in FIG. 8, a pair of openings 414 may comprise cutouts that may be defined in both the ends of the blade 41 in the longer direction of the blade 41 and may be recessed inward in the longer direction of the blade 41.

In this case, the blade 41 and the supporting member 42 may be welded to each other at two locations on opposite sides of each positioning protrusion 421 in the vicinity of each positioning protrusion 421 in a direction perpendicular to the longer direction of the blade 41. Therefore, the blade 41 may have two weld marks 48 formed on opposite sides of each positioning protrusion 421 in the shorter direction of the blade 41.

Figure 9:
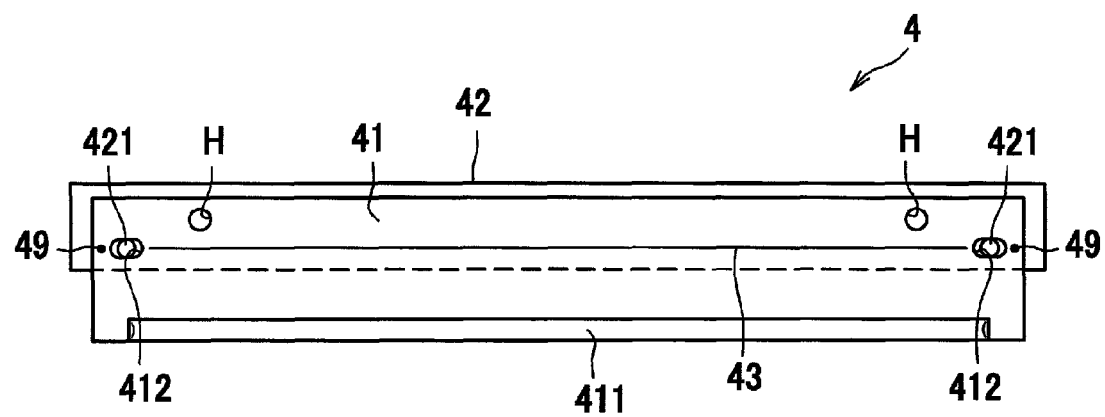
FIG. 9 illustrates a blade unit in a fifth variation according to one or more aspects of the disclosure.

In other embodiments, for example, as depicted in FIG. 9, the pair of openings 412 may comprise elongated openings only.

In this case, when the blade 41 and the supporting member 42 are fastened on a worktable prior to the welding process, the position of the blade 41 may be determined with respect to the supporting member 42 using a jig. In the welding process, a first weld mark 43 may be formed between the openings 412 and second weld marks 49 may be formed at respective locations towards the outer edges of the blade 41 from the respective positioning protrusions 421 in the longer direction of the blade 41.

As described above, in the welding process, the laser beam 81 may be moved with respect to the blade 41. However, the manner of moving the laser beam 81 with respect to the blade 41 might not be limited to that example. In other embodiments, for example, the blade 41 and the supporting member 42 may be moved with respect to the laser beam 81 and the laser beam 81 may be stationary.

In still other embodiments, the laser beam 81 and the set of the blade 41 and the supporting member 42 may be moved at the same time.

Figure 10:
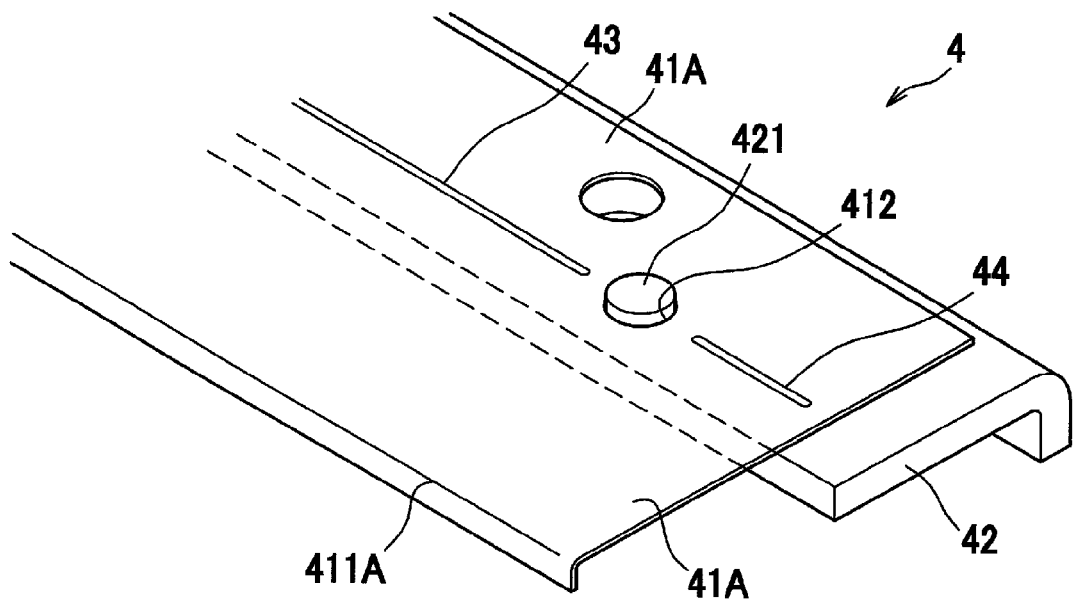
FIG. 10 is a perspective view depicting a blade unit in a sixth variation according to one or more aspects of the disclosure.
Figure 11:
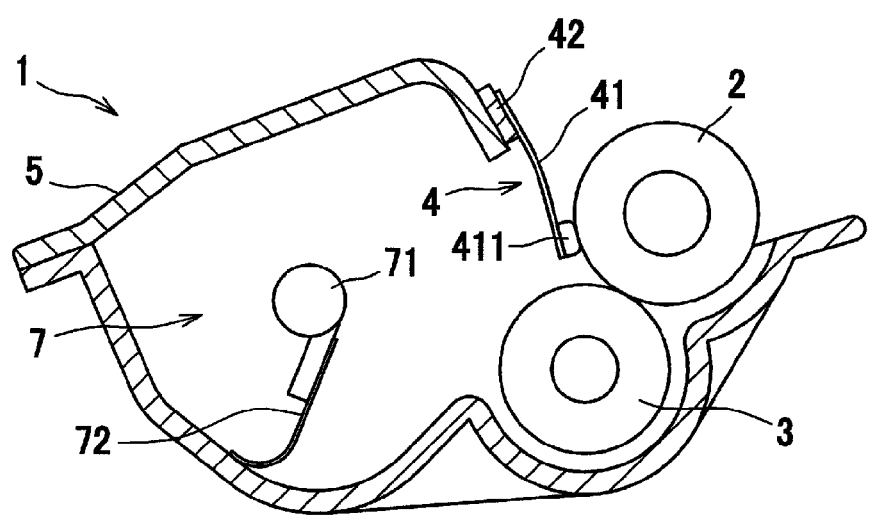
FIG. 11 is a sectional view depicting a developing device in a seventh variation according to one or more aspects of the disclosure.

As described above, the contact portion 411 may be formed on the blade 41 to protrude from the blade 41. However, the configuration of the blade 41 might not be limited to that example. In other embodiments, for example, as depicted in FIG. 10, the blade 41A might not comprise a contact portion made of, for example, rubber, but may comprise a bent portion 411A in which the distal end portion of the blade 41A may be bent toward the supporting member 42 (e.g., toward a side opposite to the developing roller 2). The bent portion 411A (e.g., the distal end of the blade 41) may directly contact the roller body 2A of the developing roller 2.

Figure 12:
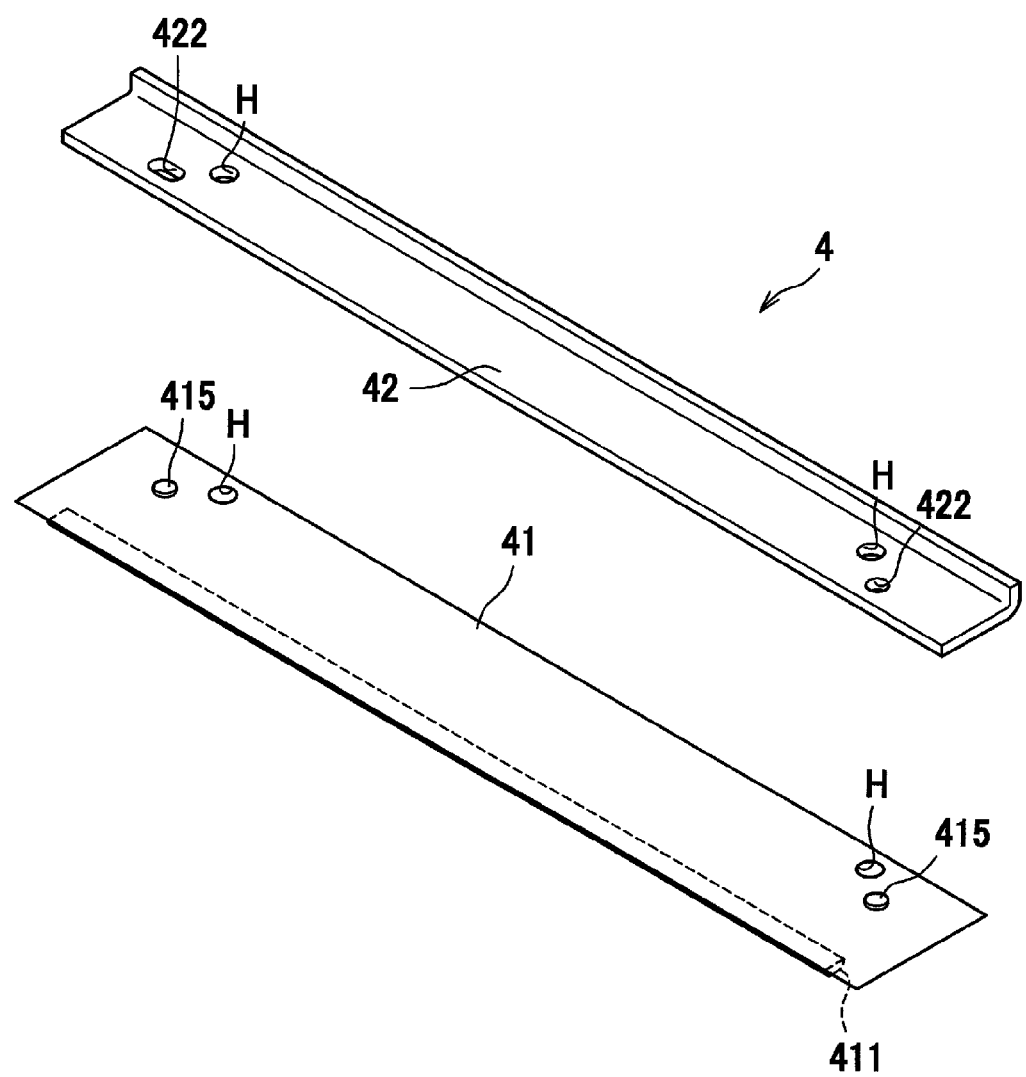
FIG. 12 is a disassembled perspective view depicting a blade unit in an eighth variation according to one or more aspects of the disclosure.

As described above, the distal end portion of the blade 41 may be placed on the developing roller 2, and the blade 41 may be pinched by the supporting member 42 and the developing case 5. However, the configuration of the blade unit 4 might not be limited to that example. In other embodiments, for example, as depicted in FIG. 12, the supporting member 42 to which the blade 41 may be welded may be fixed to the developing case 5 directly while the supporting member 42 is pinched by the blade 41 and the developing case 5. In the blade unit 4, the distal end portion of the blade 41 (e.g., the contact portion 411) may contact the developing roller 2 from the conveyor member 7 side, and the surface, which may be opposite to the surface 41F having the contact portion 411 thereon, of the blade 41 may be supported by the supporting member 42.

As described above, the developing roller 2 comprising the roller body 2A and the shaft 2B are illustrated as the developer carrier. However, in other embodiments, the developer carrier might not be limited to that example. In other embodiments, for example, a brush roller, a developing sleeve, or a belt-shaped developer carrier may be adopted as the developer carrier.

As described above, the contact portion 411 (e.g., the distal end) of the blade 41 may be in direct contact with the roller body 2A of the developing roller 2 (as an example of the developer carrier). However, the configuration of the blade might not be limited to that example. In other embodiments, for example, the blade may be disposed such that its distal end portion may be substantially 0.1 to 1.0 mm apart from the roller body 2A.

As described above, the supporting member 42 may comprise the positioning protrusions 421 and the blade 41 may have the openings 412 that may engage with the respective positioning protrusions 421. However, the configuration of the blade unit 4 might not be limited to that example. In other embodiments, for example, as depicted in FIG. 12, the blade 41 may comprise positioning protrusions 415 that may protrude toward the supporting member 42 from respective end portions of the blade 41 in the longer direction of the blade 41. The supporting member 42 may have therein openings 422 that may be defined at respective positions corresponding to the respective positioning protrusions 415.

As described above, stainless steel may be used as the metallic material for the blade 41. However, the material of the blade 41 might not be limited to that example. For example, the blade 41 may be made of, for example, steel used for springs, phosphor bronze, beryllium copper, or carbon tool steel. In a case where the steel used for springs or the carbon tool steel is used, a nickel, chromium, or zinc coating may be applied to the blade 41 to prevent or reduce rust.

As described above, the electrolytic zinc-coated carbon steel sheet may be used as the metallic material for the supporting member 42. However, the configuration of the supporting member 42 might not be limited to that example. In other embodiments, for example, the supporting member 42 may be made of a cold rolled steel plate or a tin plate, or a plate made of one of the cold rolled steel plate and the tin plate whose surface may be applied with treatment such as Parkerizing, chromating, or nickel coating. The supporting member 42 may also have a coating including press oil thereon.

What is claimed is:

1. A developing blade apparatus comprising:
   a supporting member including a protrusion; and
   a developing blade connected to the supporting member and including an opening,
   wherein the protrusion of the supporting member is disposed within the opening,
      wherein the developing blade includes a plurality of weld marks, including an elongated first weld mark and an elongated second weld mark, connecting the developing blade and the supporting member, the first and second weld marks elongated in a longitudinal direction of the developing blade, and
      wherein the protrusion and the opening are disposed between the first weld mark and the second weld mark on an imaginary straight line connecting the first weld mark and the second weld mark.

2. The developing blade apparatus of claim 1, wherein the first weld mark is spaced apart from the opening of the developing blade, and wherein a space between the first weld mark and the opening is a non-welded area.

3. The developing blade apparatus of claim 2, wherein the second weld mark is spaced apart from the opening of the developing blade, and wherein a space between the second weld mark and the opening is a non-welded area.

4. The developing blade apparatus of claim 1, wherein the first weld mark is disposed at a first location on an edge of the opening, the first weld mark contacting the edge of the opening.

5. The developing blade apparatus of claim 4, wherein the second weld mark is disposed at a second location on the edge of the opening.

6. The developing blade apparatus of claim 4, wherein the first weld mark connects the edge of the opening to the protrusion.

7. The developing blade apparatus of claim 1, wherein the imaginary straight line extends in a longitudinal direction of the supporting member.

8. A developing blade apparatus comprising:
   a supporting member including a protrusion; and
   a developing blade connected to the supporting member and including an opening,
   wherein the protrusion of the supporting member is disposed within the opening,
      wherein the developing blade includes a plurality of weld marks, including a first weld mark, a second weld mark and a third weld mark, connecting the developing blade and the supporting member,
      wherein a first imaginary straight line connecting the first weld mark and the second weld mark, a second imaginary straight line connecting the second weld mark and the third weld mark and a third imaginary straight line connecting the third weld mark and the first weld mark form a triangular area, and
   wherein at least a portion of the protrusion and the opening are disposed within the triangular area.

9. The developing blade apparatus of claim 8, wherein an entirety of the protrusion and the opening are disposed within the triangular area.

10. A method for forming a developing blade apparatus, the method comprising:
    attaching a developing blade to a supporting member including inserting a protrusion of the supporting member into an opening of the developing blade; and
    welding the developing blade to the supporting member at a plurality of weld marks including an elongated first weld mark and an elongated second weld mark, wherein the first weld mark and the second weld mark are positioned such that the protrusion and the opening are disposed between the first weld mark and the second weld mark on an imaginary straight line connecting the first weld mark and the second weld mark, the first and second weld marks elongated in a longitudinal direction of the developing blade.

11. A method for forming a developing blade apparatus, the method comprising:
   attaching a developing blade to a supporting member including inserting a protrusion of the supporting member into an opening of the developing blade; and
   welding the developing blade to the supporting member at a plurality of weld marks including a first weld mark, a second weld mark and a third weld mark, wherein the first weld mark, the second weld mark and the third weld mark are positioned such that a first imaginary straight line connecting the first weld mark and the second weld mark, a second imaginary straight line connecting the second weld mark and the third weld mark and a third imaginary straight line connecting the third weld mark and the first weld mark form a triangular area, and at least a portion of the protrusion and the opening are disposed within the triangular area.

12. A developing blade apparatus having a developing blade connected to a supporting member at a plurality of weld marks including an elongated first weld mark and an elongated second weld mark, the first weld mark and the second weld mark positioned such that a protrusion of the supporting member and an opening of the developing blade are disposed between the first weld mark and the second weld mark on an imaginary straight line connecting the first weld mark and the second weld mark, the first and second weld marks elongated in a longitudinal direction of the developing blade, the developing blade apparatus formed by a process comprising:
   inserting the protrusion of the supporting member into the opening of the developing blade; and
   welding the developing blade to the supporting member at the first and second weld marks.

13. The developing blade apparatus of claim 1, wherein the imaginary straight line is parallel to the longitudinal direction of the developing blade.

* * * * *